April 18, 1967  C. C. WOOD  3,315,184
FLEXIBLE CONNECTOR
Filed June 11, 1962
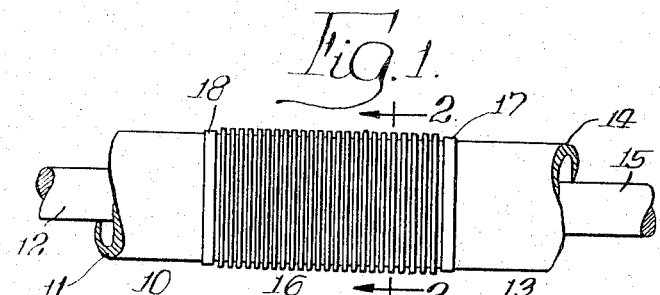
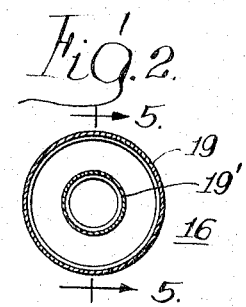
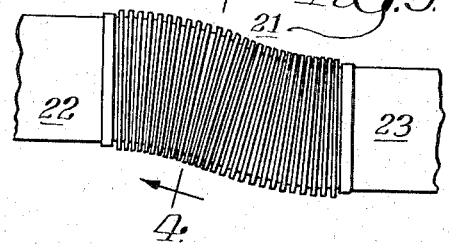
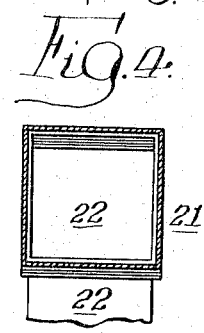
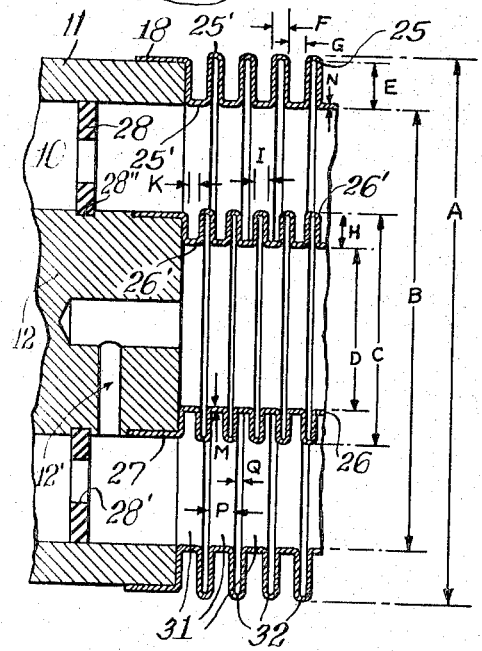
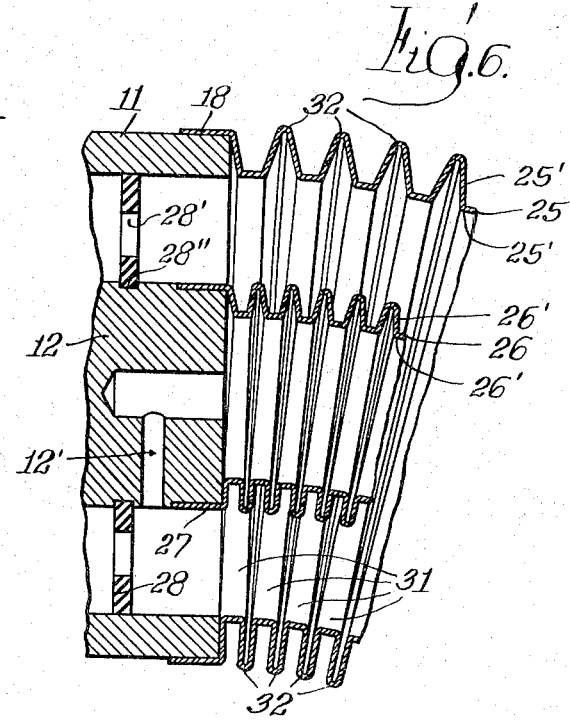
INVENTOR.
Carroll C. Wood,
BY
Hofgren, Brady, Wegner,
Allen & Stellman Attys.

United States Patent Office 3,315,184
Patented Apr. 18, 1967

3,315,184
FLEXIBLE CONNECTOR
Carroll C. Wood, Addison, Ill., assignor to The Hallicrafters Co., a corporation of Delaware
Filed June 11, 1962, Ser. No. 201,539
9 Claims. (Cl. 333—95)

This invention relates to a mechanical connector and more specifically to a connector for coupling a pair of transmission members for electrical conduction.

In the construction of electronic equipment for operation at high frequencies, certain physical limitations of placement of parts and dimension of components are encountered. These become particularly bothersome in airborne and rocketborne equipment. In addition, certain standard components are produced by manufacturers, such as tubes for generating the high frequencies, wave guide systems and coaxial conductors which have fixed dimensions. Consequently, in the assembly of such electronic equipment, physical mismatches may be encountered when laying out the components and it sometimes becomes necessary to couple together two transmission members which are not coaxially aligned and which may be subject to relative movement or vibration.

It is an object of this invention to provide an improved connector for coupling two transmission members.

It is the further object of this invention to provide a flexible connector for joining two transmission members having a predetermined impedance which does not vary with the flexing of the connector.

It is the further object of this invention to provide a flexible connector including a pair of coaxially aligned bellows-shaped members for joining two transmission members.

It is still a further object of this invention to provide a flexible connector which may be sealed against pressure variation to a pair of transmission members.

It is still a further object of this invention to provide a flexible connector for joining two coaxial transmission members that effectively isolates one from the other as far as vibration is concerned.

Still an additional object of this invention is to provide a flexible connector for joining two transmission members that is plated on the conductive side thereof with a material which has improved electrical and heat transfer characteristics.

The features of the present invention which are believed to be novel are set forth with particularity in the appended claims. The organization and manner of operation of the invention, together with further objects and advantages thereof, can best be understood by reference to the following description taken in connection with the accompanying drawings, in the several figures of which like reference numerals identify like elements, and in which:

FIGURE 1 shows an embodiment of the invention;

FIGURE 2 is a cross sectional view along line 2—2 of FIGURE 1;

FIGURE 3 shows another embodiment of the invention with the coupler in a flexed position;

FIGURE 4 is a cross sectional view along line 4—4 of FIGURE 3;

FIGURE 5 is a fragmentary sectional view along lines 5—5 of FIGURE 2; and

FIGURE 6 is a fragmentary sectional view comparable to that of FIGURE 5 wherein the connector is shown flexed.

Referring now to one embodiment of the invention shown in FIGURES 1 and 2, a first transmission member 10, as a coaxial cable including a pair of conductors 11, 12, and a second transmission member 13 having an outer conductor 14 and an inner conductor 15, are joined through a flexible connector 16. FIGURE 2, which is a cross sectional view along the line 2—2 of FIGURE 1, shows the construction of the flexible connector 16 to include an outer bellows 19 and an inner bellows 19'. The two are substantially coaxial and the spacing between them is substantially uniform throughout the connector. When the two transmission members 10, 13 of FIGURE 1 are misaligned the two bellows 19, 19' flex in a substantially similar manner and maintain the uniform spacing therebetween. The two bellows sections are constructed in a manner as hereinafter described to have substantially uniform spring rates when the connector and transmission members are subjected to vibration and flexing. By spring rate is meant that characteristic of the bellows which refers to the physical motion of portions thereof during vibration and flexing. And it is to be understood that a desirable characteristic of the flexible connector is that the substantially uniform spacing between the inner and the outer conductor be maintained constant during vibration. Therefore, portions of the bellows 19, 19' are designed to move in substantially the same direction at the same time under such vibrations thereby maintaining the uniform spacing therebetween.

The flexible connector 16 has a pair of end portions 17, 18 soldered to conductors 14 and 11, respectively, which provides for a pressure seal, preventing changes in external atmospheric composition, pressure or vacuum from changing the pressure or composition of gases inside connector 16, thereby preventing variation in the impedance and other electrical characteristics of the connector which might result from such conditions. The detailed construction of the connector 16 is more clearly shown in FIGURES 5 and 6, hereinafter described in more detail.

The embodiment of the invention shown in FIGURE 3 shows a flexible connector 21 coupled to a pair of wave guide sections 22, 23 in a misaligned condition. FIGURE 4 shows a cross sectional view of connector 21 along lines 4—4 in FIGURE 3. The embodiment shown in FIGURES 1, 2, 5 and 6 will be discussed in more detail hereinafter and it is to be understood that the structure of the connector 16 is substantially the same as that of connector 21 with the obvious difference that connector 21 is not a coaxial connector and has a rectangular rather than circular cross-section. However, similar frequency limitations, pressure requirements, flexible problems and electrical operating characteristics are encountered.

FIGURE 5 shows connector 16 in detail and includes a first or outer bellows type structure 25 and a second or inner bellows type structure 26. Bellows 25 is coupled through its end portion 18 to the outer connector 11 of coaxial transmission member 10, while bellows 26 is coupled through an end portion 27 to the inner conductor 12 of the coaxial line 10.

As shown, a spacer 28 having a passageway 28' is positioned in a slot 28" in conductor 12 to prevent longitudinal movement holds the inner and outer coaxial members 12 and 11 in spaced alignment and provides the proper spacing between bellows 25, 26. It is to be understood that a spacer (not shown) is provided between coaxial members 14, 15.

Under conditions which require the connector to operate at varying pressures, that is where the external pressure varies from the pressure existing in the connector, the end portions 18 and 27 are sealed to conductors 11, 12 by a sweating or soldering process which provides a seal which is non-porous and prevents pressure changes within the line. It is to be understood that similar seals exist at the other end of the connector. A passageway 12' is provided to allow for equalizing the pressures within bellows 26 and between the bellows 25, 26. If desirable, spacers may be provided without passageways and sealed o the conductor to maintain the pressures within the bellows while allowing variations within the coaxial members.

Bellows 25 has a series of body sections 31 which are substantially ring-like or cylindrical sections in coaxial alignment which are joined together by a series of convolutions 32 of hollow, rib-like or channel structure. The rib members 32 are formed circumferentially around the body portions 31 and have the open portion of the channels facing inwardly. When the bellows 25 is not under tension, compression or flexure the sides of rib members 32 lie in planes substantially normal to the axis of the bellows.

The body and rib portions of the bellows are manufactured by a process of forming a mandrel shaped substantially like the bellows to be produced, plating the mandrel with the desired thickness of metal such as nickel, dissolving out the mandrel leaving only the plated material in the bellows shape, and plating the bellows with the proper thickness of silver to give desired electrical characteristics to the bellows.

Bellows 26 is formed in substantially the same manner and in substantially the same general shape as bellows 25, with the obvious difference in diameter to allow mounting bellows 26 inside of bellows 25 and coaxial therewith. The silver plating 25' and 26' on bellows 25 and 26 is shown as a thin line in FIGURES 5 and 6 since its thickness is substantially less than the bellows' wall thickness.

FIGURE 6 shows connector 16 flexed to provide for misalignment of coaxial conductors between which it is connected. It is to be noted that the body sections 31 do not deform but maintain their substantially cylindrical dimensions and only change their spatial relationship to each other. Rib members 32 deform as shown to accommodate for bending the connector. The open ends of the individual channel-shaped ribs spread out in the upper portion of the connection providing a wider V-shaped rib cross-section. The lower portions of ribs 32 are U-shaped in cross-section with the open arms bent towards each other. The inner bellows 26, which has a different number of ribs per unit length than the outer bellows in the disclosed embodiment, flexes so that substantially equal spacing is maintained throughout the length of the connector. The spring rate is determined by, among other things, the thickness of material, the thickness of plating material, the spacing of the fins or convolutions, and the length of connector. It is to be understood that these views are somewhat exaggerated in their relative dimensions to show the construction and flexing action.

In use, the connector 16 has certain predetermined operating characteristics among them being an impedance which is designed to match the impedance of the coaxial transmission members 10, 13. Additionally, the connector is designed to operate in a frequency range which corresponds to that of the transmission members to which it is to be coupled. In the case of present coaxial lines, a top frequency range is of the order of 6,000 megacycles and, therefore, the characteristics of the connector 16 are designed for proper operation up to and somewhat beyond that figure for use with coaxial cable but it should be understood that the connector may be operated at higher frequencies should the need arise.

Certain of the dimensions of the bellows and the connector have critical relationships with respect to the frequency to be transmitted. It is important to avoid dimensioning elements of the connector so that the standing wave ratio is affected. This is done by using the wave length of the highest frequency to be carried by the connector as a "unit dimension." It is important that the rib or channel depth as designated by the letters E and H in FIGURE 5 be less than the quarter wave length or one fourth of the "unit dimension." In addition, the expanded open end of the rib or channel member 32 must not exceed this quarter wave length limitation when the connector is flexed. The relationship of the inner diameter of bellows 25 designated by the letter B and the outer diameter of bellows 26 designated by the letter C is important in determining the impedance of the connector.

Several of the dimensions of bellows are indicated by letter designation in FIGURE 5. One specific embodiment of the invention designed to operate between 500 mc. and 5,000 mc. with 46 ohms impedance has the following dimensions:

| | | |
|---|---|---|
| A | inches | 1.005 |
| B | do | .810 |
| C | do | .425 |
| D | do | .300 |
| E | do | .094 |
| F | do | .019 |
| G | do | .029 |
| H | do | .061 |
| I | do | .015 |
| K | do | .017 |
| M | do [1] | .00155 |
| N | do [1] | .0035 |
| Impedance | ohms | 46.3 |
| P | inches | .037 |
| Q | do | .011 |
| Wavelength at 6,000 mc. | do | 1.28 |
| ¼ wavelength | do | .32 |

[1] (Before plate) silver plate .0002–.0003″.

This unit may be varied longitudinally or axially misaligned by as much as one-quarter of an inch or formed into a 60° bend without materially changing its electrical impendance or characteristics.

While I have shown and described certain embodiments of my invention, it is to be understood that it is capable of many modifications. Changes, therefore, in construction and arrangement may be made without departing from the spirit and scope of the invention as in the appended claims.

What is claimed is:

1. A flexible connector for joining two coaxial electrical transmission members each having outer and inner conductors, for operation in a band of high frequencies, comprising: an outer conductor of cylindrical bellows-like configuration to be coupled with the outer conductors of said members; and an inner conductor of cylindrical bellows-like configuration to be coupled with the inner conductors of said members, the spring rates of said outer and inner bellows-like conductors being substantially equal.

2. A flexible coaxial connector for joining two coaxial electrical transmission members each having outer and inner conductors, for operation in a band of high frequencies, said connector having stressed and unstressed physical conditions, comprising: an outer conductor including a plurality of cylindrical sections having end portions to be coupled with the outer conductors of said transmission members, said cylindrical sections being joined by integral fins each fin having a pair of side walls extending outwardly from adjacent cylindrical sections and in the unstressed physical condition of said connector lying in radial planes, the outer edge of the walls of each fin being joined by an integral cylindrical wall section; and an inner connector including a plurality of cylindrical sections having end portions to be coupled with the inner conductors of said transmission members, said inner cylindrical sections being joined by integral fins each fin having a pair of side walls extending outwardly from adjacent cylindrical sections and in the unstressed physical condition of said connector lying in radial planes, the outer edges of said walls being joined by integral cylindrical wall sections, said outer and inner flexible conductors having substantially equal spring rates.

3. The electrical connector of claim 2 wherein the width of the outer cylindrical sections, the spacing of the fin walls and the depth of the fins of the outer flexible conductor are greater than the corresponding dimensions of the inner conductor.

4. The flexible connector of claim 3 wherein the width of the fins of both flexible conductor sections, in the unstressed physical condition, is less than one-fortieth of a wave length at the highest frequency of said band.

5. A flexible connector for joining two electrical transmission members which operate in a band of high frequencies, said flexible connector having stressed and unstressed physical conditions, comprising: a plurality of cylindrical sections having end portions to be coupled with said transmission members; and integral fins connecting adjacent cylindrical sections, said fins each having a pair of side walls one joined with each adjacent cylindrical section and in the unstressed physical condition of said connector extending outwardly from said sections in radial planes, the outer edge of the walls of each fin being joined by an integral cylindrical wall section generally parallel with said first cylindrical sections, said fins having a depth less than one-quarter wave length of the highest frequency of electrical signal in said frequency band.

6. A flexible connector for joining two electrical transmission members which operate in a band of high frequencies, said flexible connector having stressed and unstressed physical conditions, comprising: a plurality of cylindrical sections having end portions to be coupled with said transmission members; and integral fins connecting adjacent cylindrical sections, said fins each having a pair of side walls one joined with each adjacent cylindrical section and in the unstressed physical condition of said connector extending outwardly from said sections in radial planes, the outer edge of the walls of each fin being joined by an integral cylindrical wall section generally parallel with said first cylindrical sections, said fins having open inner ends in alignment with said first cylindrical sections, the width of said open ends being at least an order of magnitude less than one-quarter wave length of the highest frequency of said band.

7. A flexible connector for joining two coaxial electrical transmission members each having outer and inner conductors, for operation in a band of high frequencies, comprising: an outer conductor of cylindrical bellows-like configuration having a plurality of cylindrical sections joined by integral fins, to be coupled with the outer conductor of said members; and an inner conductor of cylindrical bellows-like configuration having a plurality of cylindrical sections joined by integral fins to be coupled with the inner conductor of said members, the sections of the outer bellows-like conductors being wider than those of the inner and the spring rates of said outer and inner bellows-like conductors being substantially equal.

8. A flexible connector for joining two coaxial electrical transmission members each having outer and inner conductors, for operation in a band of high frequencies, comprising: an outer conductor of cylindrical bellows-like configuration with a plurality of cylindrical sections joined by integral fins; and an inner conductor of cylindrical bellows-like configuration having a plurality of cylindrical sections joined by integral fins, the depth of the fins of the outer conductor being greater than the depth of the fins of the inner conductors.

9. A flexible connector for joining two coaxial electrical transmission members each having outer and inner conductors, for operation in a band of high frequencies, comprising: an outer conductor of cylindrical bellows-like configuration to be coupled to and sealed with the outer conductors of said members; an inner conductor of cylindrical bellows-like configuration to be coupled to and sealed with the inner conductors of said members; and means defining a passage joining the interiors of the two bellows-like conductors to equalize pressures therebetween.

References Cited by the Examiner
UNITED STATES PATENTS

| | | | |
|---|---|---|---|
| 1,781,124 | 11/1930 | Nein | 333—96 |
| 2,464,598 | 3/1949 | Meier | 333—95 |
| 2,522,279 | 9/1950 | Koller | 333—95 |
| 2,555,118 | 5/1951 | Coyle | 333—95 |
| 2,571,021 | 10/1951 | Early | 333—95 |
| 2,600,169 | 6/1952 | Lamb | 333—95 |
| 2,659,817 | 11/1953 | Cutler | 333—95 |
| 2,930,007 | 3/1960 | Anderson | 333—95 |
| 2,956,248 | 10/1960 | Strand | 333—95 |
| 2,986,713 | 5/1961 | Kent | 333—95 |

ELI LIEBERMAN, *Primary Examiner.*

C. BARAFF, *Assistant Examiner.*